(12) United States Patent
Graybill et al.

(10) Patent No.: US 9,235,740 B1
(45) Date of Patent: Jan. 12, 2016

(54) AUTOMATIC DRAWER STATE DETECTION

(71) Applicant: Amazon Technologies, Inc., Seattle, WA (US)

(72) Inventors: Jules Cook Graybill, Seattle, WA (US); Jonathan David Phillips, Seattle, WA (US); Wesley Scott Lauka, Seattle, WA (US); Ryan Scott Russell, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/570,999

(22) Filed: Dec. 15, 2014

(51) Int. Cl.
| | |
|---|---|
| *G06F 19/00* | (2011.01) |
| *G06K 7/10* | (2006.01) |
| *G06Q 10/08* | (2012.01) |
| *H01H 9/16* | (2006.01) |
| *G08C 17/02* | (2006.01) |

(52) U.S. Cl.
CPC .......... *G06K 7/10366* (2013.01); *G06Q 10/087* (2013.01); *G08C 17/02* (2013.01); *H01H 9/167* (2013.01); *H01H 2300/032* (2013.01)

(58) Field of Classification Search
CPC . G08C 17/02; H01H 2300/032; H01H 9/167; G06K 7/10366; G06Q 10/087
USPC ........................................................ 235/385
See application file for complete search history.

(56) References Cited

U.S. PATENT DOCUMENTS

| | | | |
|---|---|---|---|
| 8,280,547 B2 | 10/2012 | D'Andrea et al. | |
| 2003/0016136 A1* | 1/2003 | Harvey | H01H 9/167 340/686.1 |
| 2007/0057792 A1* | 3/2007 | Alden | G06F 3/0202 340/572.1 |
| 2007/0108273 A1* | 5/2007 | Harper | G06Q 10/087 235/382 |
| 2007/0115127 A1* | 5/2007 | Harper | G06Q 10/00 340/572.1 |
| 2007/0171056 A1* | 7/2007 | Beyer | H01H 9/167 340/545.2 |
| 2007/0215709 A1* | 9/2007 | Baude | G06K 19/0723 235/492 |
| 2008/0129459 A1* | 6/2008 | Bailly | H04L 67/125 340/10.1 |
| 2009/0069925 A1* | 3/2009 | Dattolo | A47J 31/40 700/114 |
| 2009/0189766 A1* | 7/2009 | Ota | G08B 13/2402 340/572.1 |
| 2009/0242367 A1* | 10/2009 | Bruel | H01H 9/167 200/308 |

(Continued)

OTHER PUBLICATIONS

U.S. Appl. No. 14/314,439, filed Jun. 25, 2014, Titled: Tracking Transactions by Confluences and Sequences of RFID Signals.

(Continued)

*Primary Examiner* — Thien M Le
*Assistant Examiner* — Claude J Brown
(74) *Attorney, Agent, or Firm* — Kilpatrick Townsend & Stockton LLP

(57) ABSTRACT

An inventory system can include radio frequency identification (RFID) tags and RFID tuners that can be brought into interacting proximity with one another to provide input or other information about the location or other condition of movable elements within the inventory system. For example, a closed or at least partially open state of a drawer can be determined based on signals from an RFID tag when the RFID tag and a corresponding RFID tuner are mounted on opposing faces of the drawer and a compartment that receives the drawer.

18 Claims, 7 Drawing Sheets

(56) References Cited

U.S. PATENT DOCUMENTS

| | | | | |
|---|---|---|---|---|
| 2010/0079289 | A1* | 4/2010 | Brandt | H01H 9/168 340/572.7 |
| 2011/0012713 | A1* | 1/2011 | Wilkinson | G06K 7/10178 340/10.3 |
| 2012/0091162 | A1* | 4/2012 | Overhultz | A47F 1/126 221/1 |
| 2012/0143427 | A1 | 6/2012 | Hoffman et al. | |
| 2012/0280044 | A1* | 11/2012 | Mullis | H01Q 1/2225 235/492 |
| 2013/0069498 | A1* | 3/2013 | Morgan | G07F 11/62 312/107 |
| 2013/0076898 | A1* | 3/2013 | Philippe | H04N 7/18 348/143 |
| 2013/0127599 | A1* | 5/2013 | Foster | G05B 19/048 340/10.5 |

OTHER PUBLICATIONS

U.S. Appl. No. 14/570,885, filed Dec. 15, 2014, Titled: Wearable Tuning Surfaces for Activating RFID Buttons or Controls.

* cited by examiner

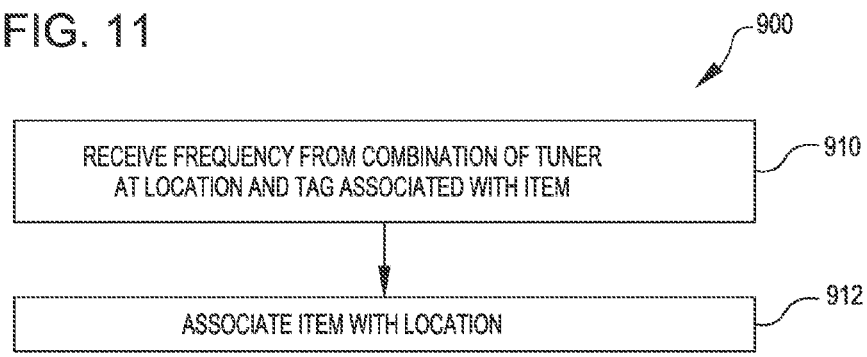
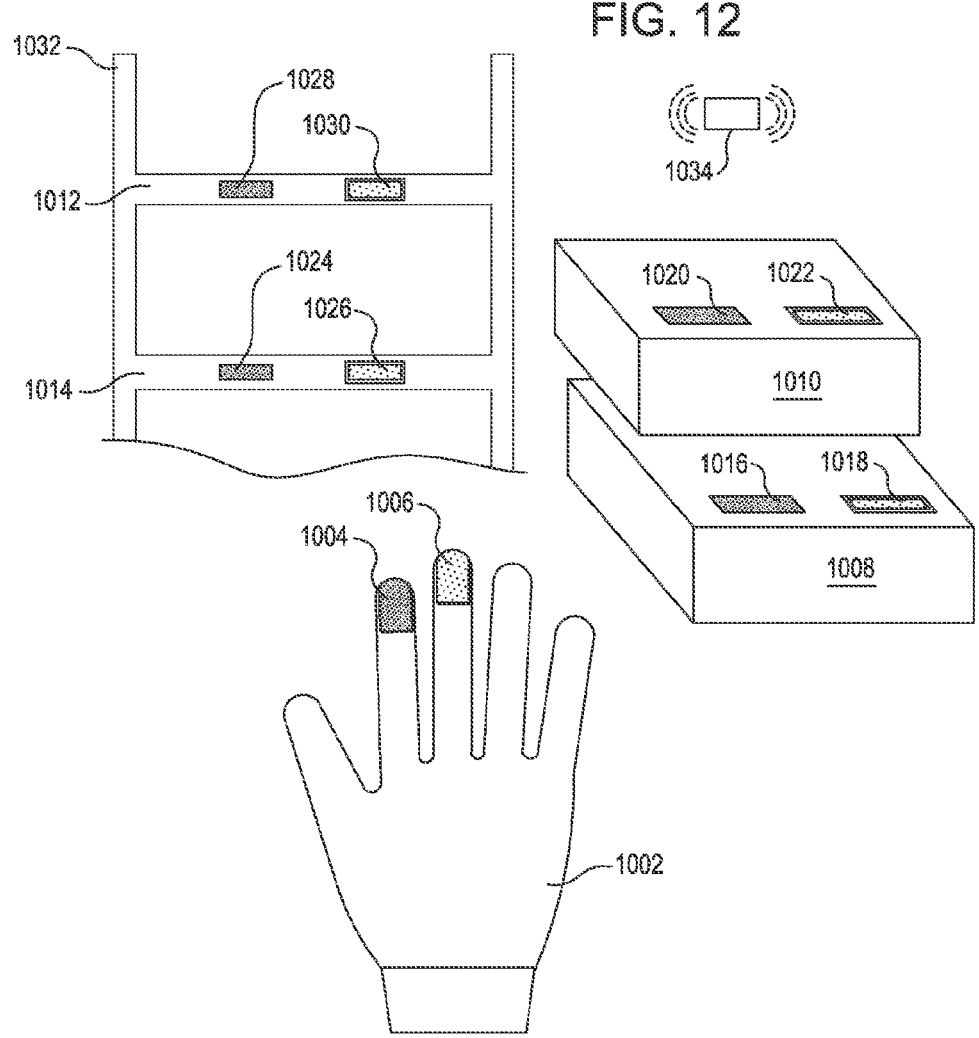

AUTOMATIC DRAWER STATE DETECTION

CROSS-REFERENCE TO RELATED APPLICATION

This application is related to and incorporates by reference for all purposes the full disclosure of co-pending U.S. patent application Ser. No. 14/570,885, filed concurrently herewith, entitled "WEARABLE TUNING SURFACES FOR ACTIVATING RFID BUTTONS OR CONTROLS".

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to ever-increasing numbers of diverse inventory requests, a similarly ever-increasing number of elements and components necessary to handle the volume of requests may reach a level at which monitoring or tracking the status of individual components becomes difficult or even impossible, which may result in inefficient utilization of system resources (e.g., space, equipment, and manpower), lower throughput, unacceptably long response times, an ever-increasing backlog of unfinished tasks, and, in general, poor system performance.

BRIEF DESCRIPTION OF THE DRAWINGS

Various embodiments in accordance with the present disclosure will be described with reference to the drawings, in which:

FIG. 11 is a flowchart illustrating a process that can be performed by a management module, according to at least some embodiments.

FIG. 12 illustrates a wearable accessory for activating one or more RFID tags of other elements of an inventory system, according to at least some embodiments;

DETAILED DESCRIPTION

Figure 1:
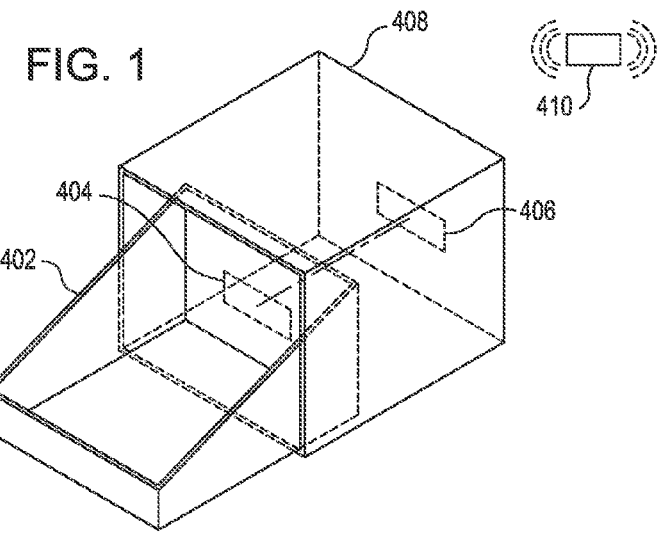
FIG. 1 illustrates an example of a drawer with a closure state detectable via an RFID tag and RFID tuner according to at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and drive units for moving the inventory holders. Specifically, features herein are directed to such systems utilizing RFID tags and RFID tuners, such as to provide input or other information about the location or other condition of movable elements, such as may be employed within the inventory system. RFID tuners can be brought into contact (or sufficient proximity) with RFID tags to change the operating conditions of the RFID tags. For example, an RFID tuner brought into contact with an RFID tag may complete a circuit for the RFID tag—or affect an RF response transmitted by the RFID tag—to toggle the RFID tag between a broadcasting mode and a non-broadcasting mode or to shift the RFID tag from one broadcasting frequency to another broadcasting frequency. Such changes in operation may be detected by one or more RFID readers in order to determine a location of an item, for example, of a drawer relative to a compartment, of an inventory item, of an operator, of a receptacle for receiving inventory items, or of any other element within the inventory system.

In accordance with an example embodiment, a drawer is receivable in a compartment and includes one or more RFID tags. The compartment includes one or more RFID tuners such that the RFID tag(s) on the drawer will engage the RFID tuner(s) as the drawer moves relative to the compartment. As a result, the state of the drawer (e.g., whether open or closed, or an amount that the drawer is open or closed) can be determined based on changes in RF response of the tags detected by an RFID reader. In another example embodiment, a movable container includes an RFID tag on a bottom of the container. A series of adjacent loading zones each include different RFID tuners. As such, when the container is set down into one of the loading zones, a signal from the RFID tag is transmitted in a frequency band determined by the specific RFID tuner of the utilized loading zone. Hence, the signal may be received by an RFID reader and used to determine which loading zone has received the container and when the container is added and/or removed relative to a specific loading zone. In a further example embodiment, a glove or other wearable accessory includes one or more RFID tuners that can be brought into engagement with RFID tags on inventory items and/or inventory holders in order to activate the RFID tags and communicate information about the objects with the activated RFID tags, e.g., that an inventory item including an activated RFID tag has been stowed, picked, and/or counted relative to a bin of an inventory holder including an RFID tag activated within a shared timeframe or sequence.

Referring now to the figures, FIG. 1 illustrates an example of a drawer 402 with a closure state detectable via an RFID tag 404 and RFID tuner 406. The drawer 402 can include the RFID tag 404 mounted thereon, such as in a rear surface of the drawer 402. A compartment 408 configured for receiving the drawer 402 can include the RFID tuner 406, such as on a surface that a rear of the drawer 402 abuts when the drawer is fully closed within the compartment 408. When the drawer 402 is open, as is shown in FIG. 1, the RFID tag 404 and the RFID tuner 406 are separated from one another. When separated, the RFID tag 404 may broadcast a signal detectable by an RFID reader 410 (or multiple RFID readers 410). On the other hand, when the drawer is closed, the RFID tag 404 may come into contact (or sufficient proximity) with the RFID tuner 406 such that the RFID tuner 406 interacts with the RFID tag 404 to deactivate the signal broadcast to the RFID reader 410. Thus, the state of the drawer (e.g., whether the drawer is open or closed) can be determined based on whether the RFID reader 410 is detecting a signal from the RFID tag 404 or not.

Although this illustrative example is provided using the arrangement of elements just described, many other arrangements may be utilized to yield a similar result. For example, the positions of the RFID tag 404 and the RFID tuner 406 may be reversed, such that drawer 402 includes the RFID tuner 406 and such that the compartment 408 includes the RFID tag 404. Similarly, the response of the RFID tag 404 may be reversed such that the RFID tag 404 is configured to broadcast in a certain frequency when joined with the RFID tuner 406 and to cease broadcasting (or shift to another frequency, which may be detected by the same or a different RFID reader 410) when separated from the RFID tuner 406. Additionally, the RFID tag 404 and RFID tuner 406 may be located on different faces of the drawer 402 and compartment 408, such as on a top surface, a bottom surface or any side surface instead of the rear surface. Furthermore, although some additional embodiments herein are also related to drawer state determination (e.g., those described below with respect to FIGS. 7-9), pairs of RFID tags and RFID tuners can also be utilized to indicate locations and/or conditions of other inventory system elements, including, but not limited to, containers, bins, totes, operators, items, and inventory holders as described in greater detail in FIGS. 10-12.

Figure 2:
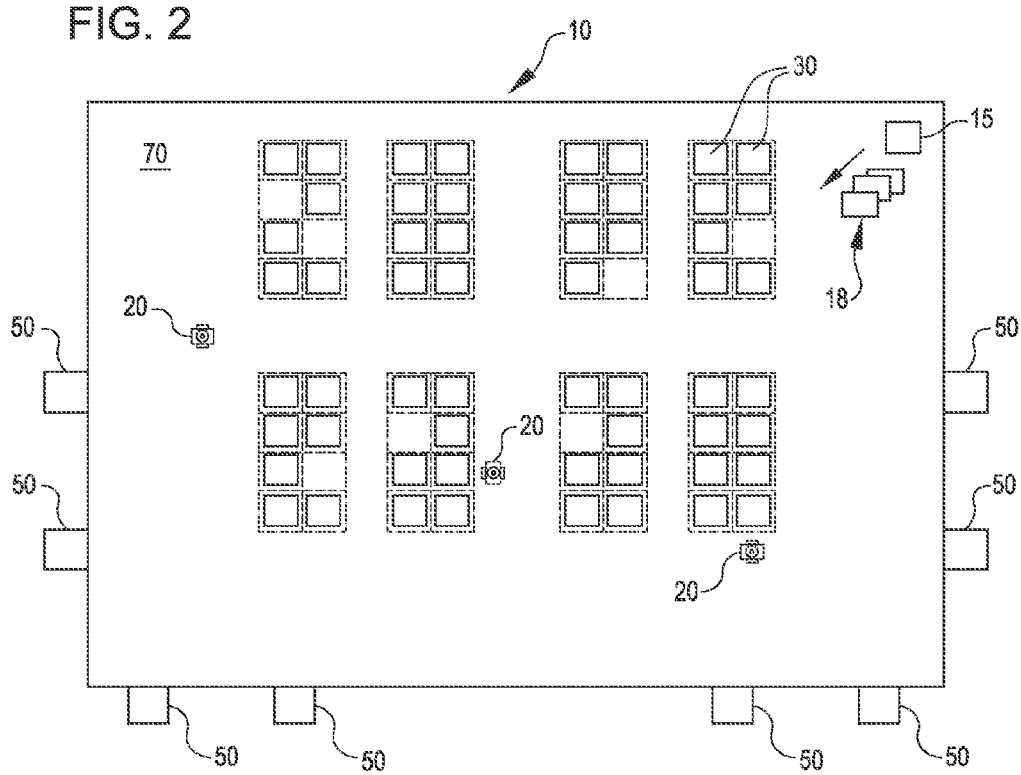
FIG. 2 illustrates components of an inventory system according to some embodiments.

In some embodiments, the compartment 408 and drawer 402 form a portion of an inventory holder 30 (e.g., FIG. 6); however, as may be appreciated with reference to additional figures herein, the compartment 408 and drawer 402 may represent a portion of any structure of the inventory system 10 described herein with respect to FIG. 2 and other figures. FIG. 2 illustrates the contents of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interaction between a particular mobile drive unit 20 and management module 15 that is described below may, in particular embodiments, represent peer-to-peer communication between that mobile drive unit 20 and one or more other mobile drive units 20. The contents and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The contents and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
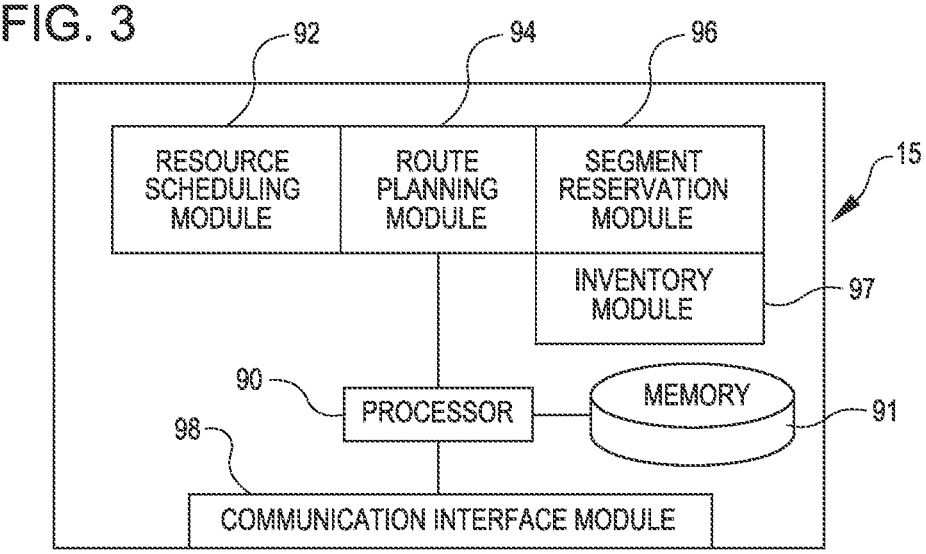
FIG. 3 illustrates in greater detail the components of an example management module that may be utilized in particular embodiments of the inventory system shown in FIG. 2.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or non-volatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
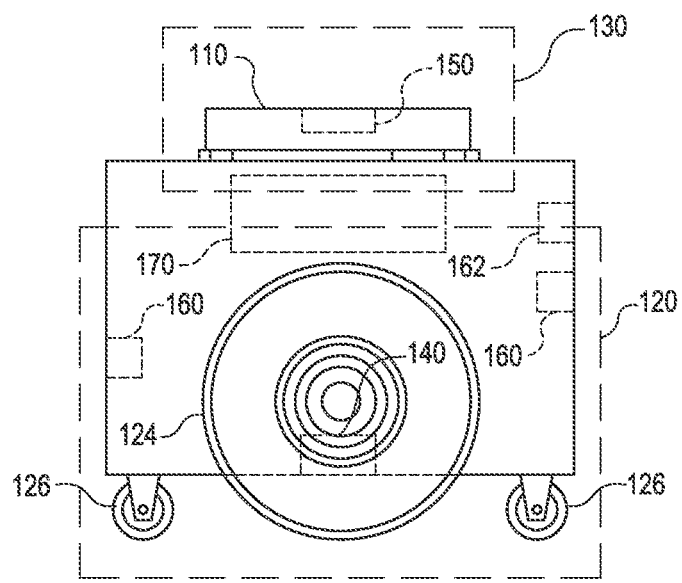
FIGS. 4 and 5 illustrate in greater detail an example mobile drive unit that may be utilized in particular embodiments of the inventory system shown in FIG. 2.
Figure 5:
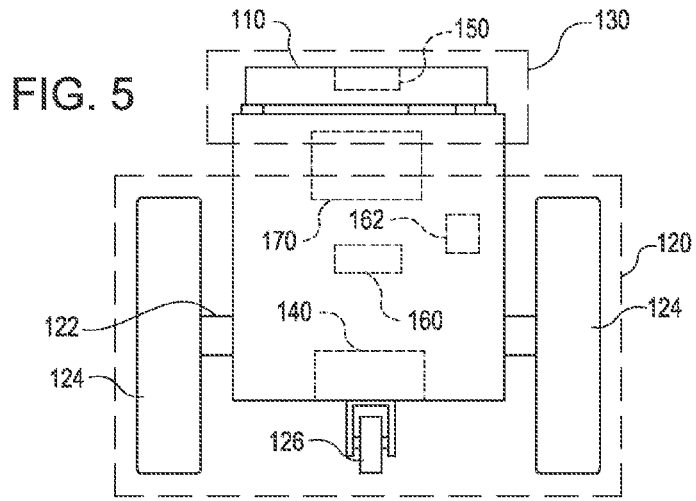

FIGS. 4 and 5 illustrate in greater detail the components of a particular embodiment of mobile drive unit 20. In particular, FIGS. 4 and 5 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 6:
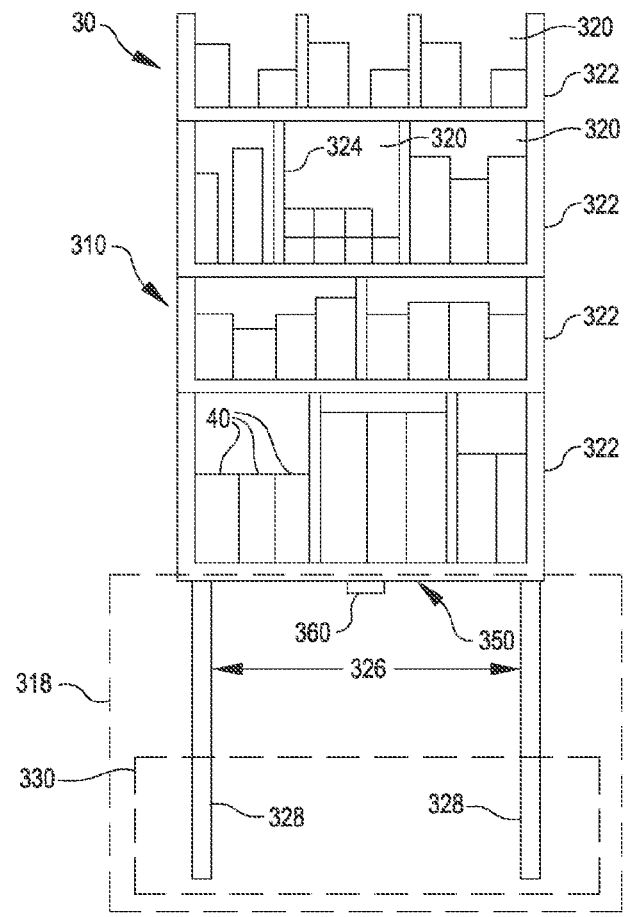
FIG. 6 illustrates in greater detail an example inventory holder that may be utilized in particular embodiments of the inventory system shown in FIG. 2.

FIG. 6 illustrates in greater detail the components of a particular embodiment of inventory holder 30. In particular, FIG. 6 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks. For example, any inventory bin 320 may include one or more compartments 408 with one or more corresponding drawers 402, such as described with respect to FIG. 1 above.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Any tray 322 may also include one or more compartments 408 with one or more corresponding drawers 402, such as described with respect to FIG. 1 above.

Additionally, in particular embodiments, frame 310 may represent a load-bearing surface mounted on mobility element 330. Inventory items 40 may be stored on such an inventory holder 30 by being placed on frame 310. In general, frame 310 may include storage internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

As described above, embodiments herein are directed to the use of RFID tags and RFID tuners in an inventory system 10, such as to provide input or other information about the location or other condition of movable elements within the inventory system 10.

Some examples of RFID usage in inventory systems are disclosed in U.S. patent application Ser. No. 14/314,439, filed on Jun. 25, 2014, titled "TRACKING TRANSACTIONS BY CONFLUENCES AND SEQUENCES OF RFID SIGNALS" ("the '439 application"), the entire disclosure of which is herein incorporated by reference. Portions of the '439 application are included herein.

RFID refers to a wireless, non-contacting system for transferring data by way of radio frequency electromagnetic fields. In an RFID system, data transfers occur in the form of modulated signals transmitted between an RFID tag (or an RFID device), which may include various communication components, logic or circuitry, and an RFID reader, which may include antennas or other like devices. Data stored within a microchip or other storage device associated with the RFID tag may be sent to the RFID reader, which may interpret not only the data received in the RFID signal but also other relevant information or attributes of the RFID signal, such as an intensity or a frequency of the RFID signal, as well as a direction from which the RFID signal originated, a range traveled by the RFID signal or at least some of the information or data included in the RFID signal. The transfer of the RFID signal is initiated when an electric field or a magnetic field transmitted by an RFID reader is sensed by an RFID tag, which transmits information or data that may be stored in association with the RFID tag in one or more microchips or other storage devices.

RFID systems provide a number of advantages over similar systems for the short-range transfer of information or data. First, an RFID tag may be formed of components having remarkably small, compact shapes and sizes, and RFID tags that are as thin as a sheet of paper or smaller than a grain of rice are quite common. Additionally, unlike a bar code (e.g., a one-dimensional bar code or a two-dimensional "QR" code), an RFID tag need not be provided within a line of sight of an RFID reader in order to successfully transmit data. Therefore, RFID tags may be concealed or embedded into many different types of objects of any size or shape, as well as humans or other animals. Next, an RFID tag may be programmed with a fixed set or packet of "read-only" data which may be transmitted to an RFID reader countless number of times in theory, or reprogrammed with modifiable sets of data that may be written and rewritten, as needed, based on the application in which the RFID tag is provided. Moreover, and perhaps most importantly, while an active RFID tag includes and utilizes a local power source, such as a battery, a passive RFID tag does not require any power in order to successfully transmit a set or packet of data to an RFID reader, and may therefore transmit such data when power supplies are unavailable or in environments where providing power to the RFID tag is infeasible.

RFID signals may be transmitted from an RFID tag to an RFID reader in many different formats and at many different frequency levels. An RFID tag that transmits signals within low frequency (LF), medium frequency (MF) or high frequency (HF) levels (e.g., approximately 3 kilohertz to 30 megahertz, or 3 kHz-30 MHz) may transfer relatively small-sized sets or packets of data over short ranges (e.g., between ten and one hundred centimeters, or 10-100 cm). Other RFID tags may transmit signals at higher frequency levels, such as ultrahigh frequency (UHF) or microwave levels (e.g., approximately 300 megahertz to 300 gigahertz, or 300 MHz-300 GHz) including larger sets or packets of data at ranges of one meter (1 m) or longer.

A signal transmission from an RFID tag to an RFID reader may be achieved in any number of ways. An inductively coupled RFID tag is an RFID tag that is powered by energy obtained from magnetic fields generated by an RFID reader, and may be coupled to the RFID reader using this energy. In this regard, an RFID reader may include one or more coils through which an electric current may pass, thereby causing a magnetic field to be generated by the RFID reader according to Ampere's Law. Likewise, an inductively coupled RFID tag may also include one or more coils. When the RFID tag passes within a particular range of the RFID reader, an electric current is generated within the coils of the RFID tag, thereby coupling the RFID reader and the RFID tag based on the magnetic flux passing through the respective sets of coils. The electric current passing through the coils of the RFID tag may then power internal circuits within the RFID tag, and cause an RFID signal to be transmitted from the RFID tag to the RFID reader accordingly. Thus, inductively coupled RFID tags are commonly used in powerless environments where a passive system for transmitting signals may be required.

Additionally, an RFID tag may be coupled by any number of other modes. For example, capacitively coupled RFID tags include coupling plates that are designed to correspond to a plate of an RFID reader. When the RFID tag is placed in sufficiently close proximity to the RFID reader, thereby causing the corresponding coupling plates of the RFID tag and the RFID reader to be aligned in parallel with one another and within a short range, a transfer of data from the RFID tag to the RFID reader is achieved. Unlike an inductively coupled RFID tag, which is powered by a magnetic field generated by an RFID reader, a capacitively coupled RFID tag is powered by an alternating electric field generated by an RFID reader. For this reason, capacitively coupled RFID tags usually have more limited operating ranges than inductively coupled RFID tags and are typically employed in near-field communication environments. Similarly, a backscatter-coupled RFID tag receives power emitted from an RFID reader's antenna. A portion of the emissions from the RFID reader are received by a corresponding antenna of the RFID tag and may be filtered or rectified, as necessary, in order to trigger a transfer of data from the RFID tag to the RFID reader. Any type or mode of coupling between an active, semi-active (e.g., powered on a temporary basis or for limited purposes) or passive RFID tag and an RFID reader may be utilized in accordance with the present disclosure.

In addition to RFID tags which are automatically coupled with an RFID reader, an RFID tag, such as a passive RFID tag, may be manually activated, e.g., coupled upon a manual action, by a human or machine in order to cause a transmission of a data signal from the RFID tag to one or more RFID readers. A manually activated RFID tag may include physical or virtual switches that may close a circuit within the RFID tag and thereby permit the RFID tag to function as a data transmitter in the presence of an electric or magnetic field. For example, a manually activated RFID tag may include capacitive elements that define a capacitor within the RFID tag, and may effectively close a circuit within the RFID tag when such elements detect bioelectricity from a user. The term "bioelectricity" generally refers to electrical charges or electric field gradients that may be stored within a living body, such as a human body, which contains blood and other matter having a variety of positively and negatively charged ions (e.g., sodium, chloride and others). Bioelectricity within a body may cause a change in capacitance of such elements in a vicinity of a location touched by the body (e.g., a digit such as a finger or thumb), due to disruptions in electrical fields caused by the body's presence, thereby further causing a change in the time constant of the RFID tag, and a discharge of the capacitor in an amount that may be defined as a function of the resistance of the capacitive elements.

In some manually activated RFID tags, such capacitive elements may be formed into a layered stack or may include a substantially linear or planar gap or break, and may be covered with a flexible protective layer formed from one or more plastics or rubbers (e.g., acrylics, vinyls, polyurethanes or the like), or other like materials. The protective layer may be adhered to one or more capacitive elements of an RFID circuit, which may include elements formed from a conductive material such as aluminum, copper, silicon or indium tin oxide that are separated by an air gap. When a user touches a protective layer of an RFID tag with a finger, which is a bioelectric conductor, a change in the effective capacitance (on the order of approximately one picofarad) between the elements, which are also conductors, in a vicinity of a point or points of contact with the protective layer is introduced. Such contact forms a conductive bridge across the elements, thereby causing disruptions in electrical fields in the vicinity of one or more of the elements, and further causing an internal current flow through the RFID tag circuit.

Further, in addition to capacitive elements, a circuit of an RFID tag may include other components for enabling a manual actuation thereof by a human or a machine, including one or more substantially planar conductive elements that may be separated by an air gap. Such an air gap between the conductive elements defines an open switch within the circuit of the RFID tag, which may also be covered with a flexible protective layer that may be formed from one or more plastics, rubbers, or other like materials. When a user contacts an external surface of the RFID tag corresponding to the air gap, e.g., the flexible protective layer over the air gap, at least two of the conductive elements are placed in contact with one another, thereby bridging the air gap between the conductive elements and closing the open switch. Subsequently, an internal current flow through the RFID tag circuit is enabled. Because the bridging of the air gap and the closure of the open switch is registered by manually driven electrical contact, a manually activated RFID tag including substantially planar conductive elements does not require bioelectricity in order to operate properly, and a user may interact with the RFID tag using not only his or her fingers or hands (which may be gloved or ungloved) but also a stylus, a pointer or another like object.

An RFID tag may interact with an RFID tuner to alter a condition of an RFID tag, e.g., to adjust (or "tune") signals that an RFID reader (or set of RFID readers) may detect from the RFID tag. To this end, an RFID tuner (which may be a separate and distinct component from either or both of the RFID tag and RFID reader) can include any appropriate components for altering circuitry of an RFID tag, current flow or other flow affecting the RFID tag, magnetic fields or other fields affecting the RFID tag, and/or other aspects that may affect the signals emitted by, or readable from, the RFID tag. For example, an RFID tag may include a break or gap in a circuit, and an RFID tuner may include a corresponding conductive surface capable of bridging the gap so that contact between the RFID tuner and RFID tag completes the circuit and enables the circuit's functionality, such as activating, deactivating, or altering a frequency or other characteristic of a signal presented by the RFID tag. As another example, an RFID tuner may include a piece of conductive metal of a particular length, geometry, and/or composition effective to modify a structure in a circuit (e.g., changing an effective length of an antenna) of an RFID tag when brought within a sufficient proximity. In some embodiments, an individual RFID tag may exhibit different broadcasting characteristics when exposed to different RFID tuners (e.g., having different amounts, structures, and/or types of material). As an illustrative example, an RFID tag may be configured to broadcast within a first frequency band (e.g., readable by a first RFID reader) when in the presence of an RFID tuner having a first metal composition, not broadcast at all when no RFID tuners are present, and broadcast within a second, different frequency band (e.g., readable by a second RFID reader, or also readable by the first RFID reader) when in the presence of an RFID tuner having a second, distinct metal composition. Generally speaking though, the effect of an RFID tuner on a signal of an RFID tag may depend on a relative location of the RFID tuner with respect to the RFID tag (e.g., whether or not the RFID tuner is proximally located with the RFID tag), such that the RFID tag is in a first condition (e.g., presenting a first type of signal to an RFID reader) when the RFID tag is at a first position relative to the RFID tuner and such that the RFID tag is in a second condition (e.g., presenting a second, different type of signal to the RFID reader) when the RFID tag is at a second, different position relative to the RFID tuner.

Figure 7:
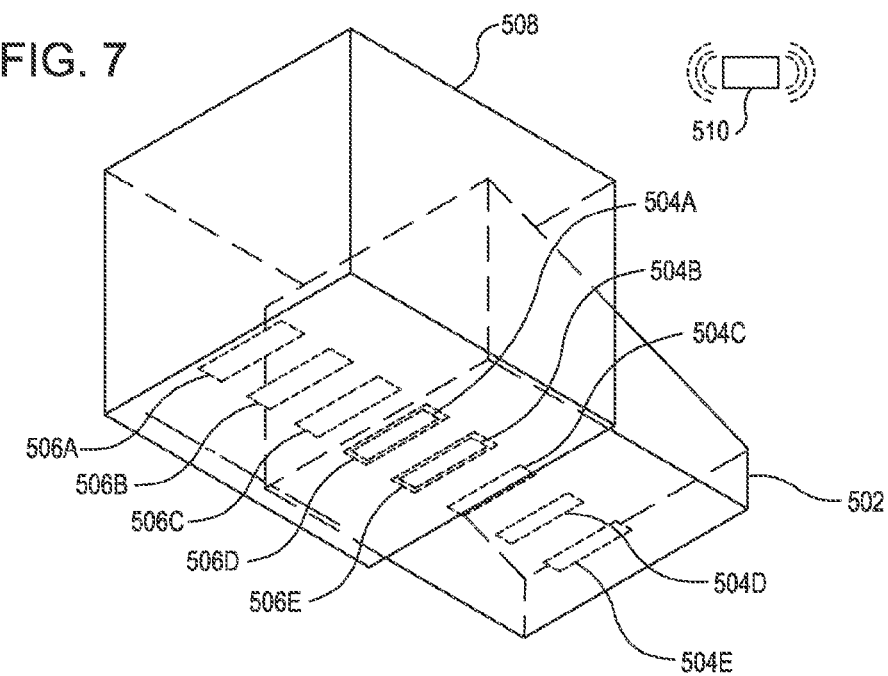
FIG. 7 illustrates an example of a drawer with a closure state detectable based on a plurality of RFID tags and a plurality of RFID tuners, in accordance with at least some embodiments.

FIG. 7 illustrates an example of a drawer 502 with a closure state detectable based on a plurality of RFID tags 504a-504e and RFID tuners 506a-506e, in accordance with a particular embodiment. Each of the first through fifth RFID tags 504a-504e mounted on the drawer 502 can interact with any of the first through fifth RFID tuners 506a-506e mounted in a compartment 508 for receiving the drawer 502. For example, a first RFID tag 504a may broadcast when in contact with the first RFID tuner 506a, the second RFID tuner 506b, the third RFID tuner 506c, the fourth RFID tuner 506d, or the fifth RFID tuner 506e. Thus, when the drawer 502 is completely closed, each RFID tag 504a-504e may be in contact with a respective RFID tuner 506a-506e such that all of the RFID tags 504a-504e are broadcasting signals detectable by an RFID reader 510. As the drawer 502 is opened, fewer of the RFID tags 504a-504e are in contact with RFID tuners 506a-506e. For example, when the drawer is 60 percent open, as shown in FIG. 7, the first RFID tag 504a may be in contact with the fourth RFID tuner 506d and second the RFID tag 504b may be in contact with the fifth RFID tuner 506e so that the first and second RFID tags 504a and 504b broadcast while none of the other (e.g., third, fourth, and fifth) RFID tags 504c-504e broadcast. As such, with only two RFID tags 504 broadcasting, the management module may determine that the drawer is 60 percent open. Additionally, although the RFID tuners 506a-506e are depicted as distinct components in FIG. 7, in some embodiments, the RFID tuners 506a-506e may be a single component (e.g., a single strip of metal that can simultaneously cause any of the RFID tags 504a-504e that are in contact with the strip to broadcast in order to determine a closure state of the drawer 502). Furthermore, in this and many other embodiments described herein, reversing the RFID tags and RFID tuners relative to one another may provide a comparable function. For example, although the description above states that the RFID tags 504a-504e are on the drawer 502 and the RFID tuners 506a-506e are on the compartment 508, the components could be reversed (e.g., so that the RFID tuners 506a-506e are on the drawer 502 and the RFID tags 504a-504e are on the compartment 508) without impairing the function of detecting the closure state through the relative positioning of the RFID tags 504a-504e and the RFID tuners 506a-506e. Alternatively, the RFID tags 504a-504e and the RFID tuners 506a-506e may be positioned on any other corresponding surfaces or faces of the compartment 508 and drawer 502.

Figure 8:
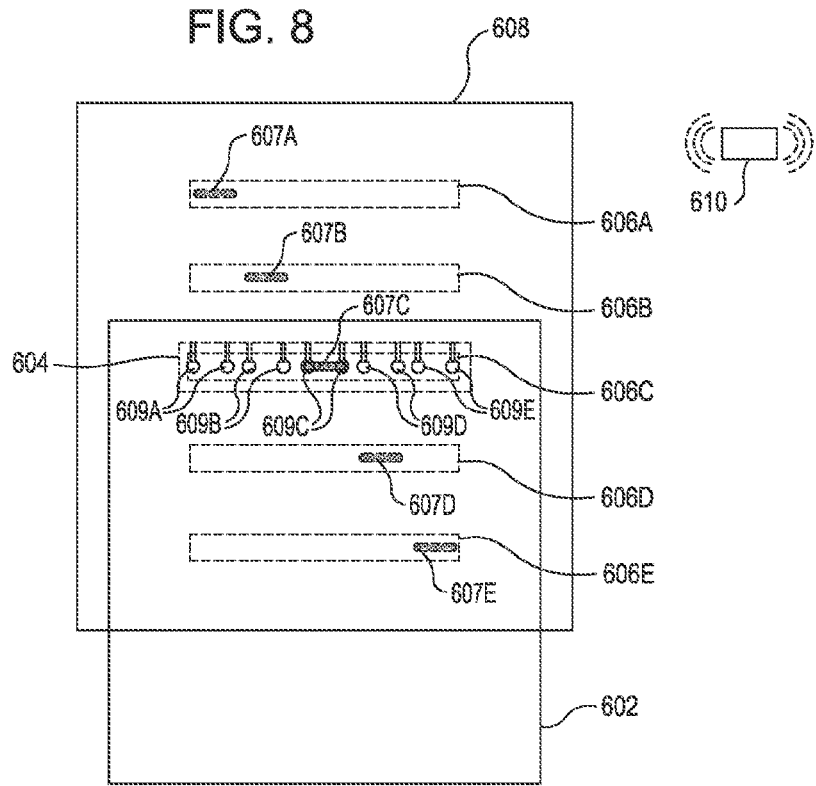
FIG. 8 illustrates a bottom view of an example of a drawer with a closure state detectable based on an RFID tag and a plurality of RFID tuners, in accordance with at least some embodiments.

In some embodiments, an RFID tag can interact with different types of RFID tuners to cause the RFID tag to exhibit a different condition according to each unique or different RFID tuner. For example, FIG. 8 is a bottom view of a drawer 602 with respect to a compartment 608. An RFID tag 604 on the drawer 602 may move relative to the various RFID tuners 606a-606e as the drawer 602 moves with respect to the compartment 608. As the RFID tag 604 encounters each individual RFID tuner 606a-606e, the RFID tag 604 may broadcast a slightly different signal to be received by an RFID reader 610. For example, each RFID tuner 606a-606e may include a respective conductive strip 607a-607e positioned so as to bridge a different set of contacts 609a-609e within the RFID tag 604, thus triggering different conditions for the RFID tag 604 for each of the RFID tuners 606a-606e. The particular signal broadcast by the RFID tag 604 may thus depend upon the RFID tuner 606a-606e that is interacting with the RFID tag 604. In this way, the signal detected by the RFID reader 610 may indicate the position of the RFID tag 604 relative to the compartment 608 based on the respective location of the RFID tuner 606a-606e affecting the detected signal.

Figure 9:
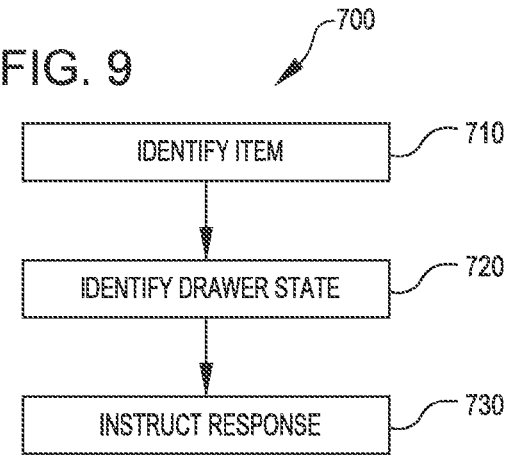
FIG. 9 is a flowchart illustrating an example process that can be performed by a management module according to at least some embodiments.

FIG. 9 is a flowchart illustrating an example process 700 that can be performed by a management module 15 according to a particular embodiment. The process 700 can include operations including an identify item operation 710, an identify drawer state operation 720, and an instruct response operation 730.

At 710, an item can be identified by any suitable identification technology. For example, a bar code scan can be received, or an RFID tag attached to or otherwise associated with the item can be read in order to identify a particular item within the inventory system. In some aspects, the item may be identified according to a record stored in the inventory system about the position for the item. For example, an item may be indicated by an activated light, such as a laser pointer, indicating a position on an inventory holder 30, e.g., within a particular drawer in a compartment, of the identified item.

At 720, a drawer state can be identified. For example, the drawer state can be determined using any of the techniques described herein. For example, the drawer state can be determined based on RFID signals received from one or more RFID tags on one of the drawer or a compartment that receives the drawer, in combination with one or more RFID tuners on the other of the drawer or the compartment that receives the drawer, as described herein.

At 730, a response can be instructed. The instructed response can be based on a drawer state identified at 720 and may also be based on an item identified at 710. As a first illustrative example, for a stowing operation, an item may be identified at 710 such as a red T-shirt. A drawer may be identified as having been opened, based on received RFID signals, after the red T-shirt was identified. At 730, the instructed response may be to associate a position of the identified red T-shirt with the location of the drawer that was identified as having been opened based on the received RFID signals. In another illustrative example, a location for an item that is stowed may be determined based on a drawer that was recently closed based on received RFID signals. Similarly, responses instructed at 730 may include associating a location of an item that was counted or removed from an inventory holder with a location of a drawer that was recently opened and/or closed, as identified in operation 720 based on received RFID signals. In another example, an item identified at 710 may be an item to be removed from a specific location, i.e., a specific drawer, of an inventory holder. A drawer state identified at 720 may indicate a drawer, based on received RFID signals, that was accessed for the identified item. The response instructed at 730 may include confirming that the accessed drawer, based on the received RFID signals, was the drawer identified for the item. The response may also include generating a set of instructions to an operator in order to remedy a mistake when a selected drawer, based on received RFID signals, is not the designated drawer. Further, with respect to the example embodiments of FIGS. 7 and 8, the drawers 502, 602 may be configured to store various different types of inventory items within particular portions of each drawer. For example, a forward portion of a drawer 502, 602 may receive one type of item, whereas a rearward portion of a drawer 502, 602 may receive another type of item. In this example, based on the received RFID signals indicating how far the drawer 502, 602 was opened, a response instructed at 730 may determine that an operation was performed on either the one type of item or the other type of item positioned in different portions of each drawer. Alternatively or additionally, each drawer may further comprise dividers that differentiate and/or segregate particular portions of each drawer. In another example, if a large item is stored in the drawer 502, 602, e.g., an item that substantially fills the available space of the drawer, and an RFID signal is received that indicates that the drawer was opened more than 80%, i.e., opened enough for the large item to be removed, then a response instructed at 730 may determine that the large item has been removed from the drawer 502, 602; alternatively, if an RFID signal is received that indicates that the drawer was opened less than 20%, i.e., not opened enough for the large item to be removed, then a response instructed at 730 may determine that the large item has not been removed from the drawer 502, 602 and/or that a smaller item was removed instead. In a further example, a drawer 502, 602 may be detected as having been fully removed from the compartment 508, 608 based on received RFID signals e.g., a drawer 502, 602 that is suddenly not detected at all after being detected successively at 90% open and 100% open based on the received RFID signals may indicate that the drawer 502, 602 has been fully removed. In some embodiments, the identity of a drawer and/or a compartment from which or into which the drawer is inserted or removed can be identified by combinations of RFID tags and/or RFID tuners that provide uniquely identifiable signals.

In some embodiments, the identify item operation 710 can be omitted. For example, at 720, a drawer state may be identified indicating that a drawer is open on an inventory holder. The response instruction 730 may include preventing movement of the inventory holder while the drawer is still open.

Figure 10:
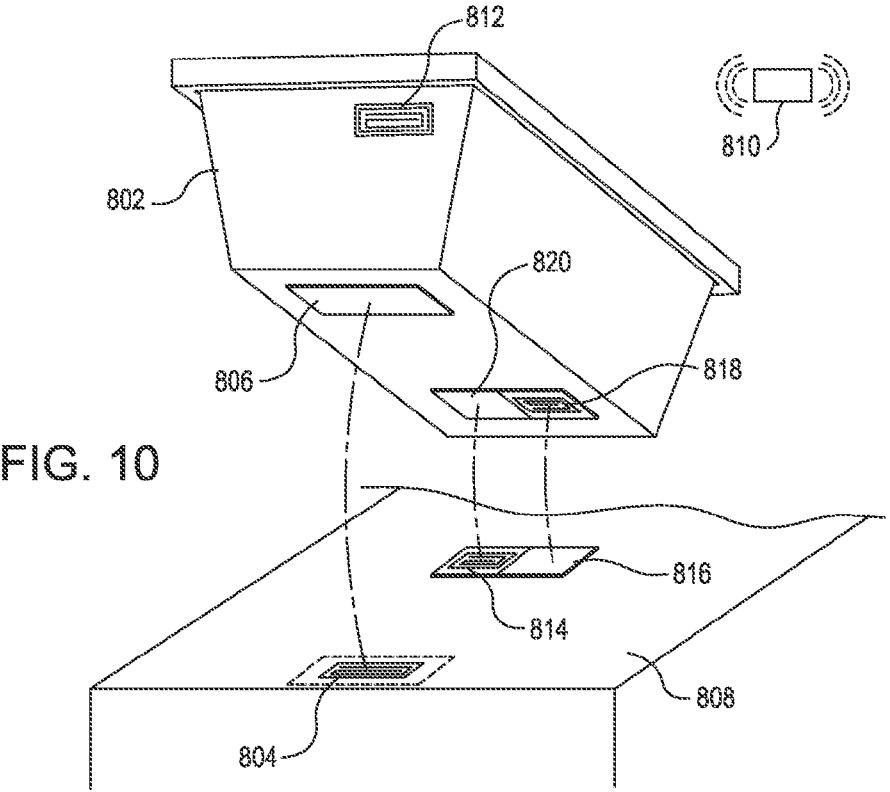
FIG. 10 illustrates a container that can be located based on a pair including an RFID tag and an RFID tuner, according to at least some embodiments.

FIG. 10 illustrates a container 802 that can be located, based on a pair including an RFID tag 804 and an RFID tuner 806 according to a particular embodiment. For example, the container 802 may include an RFID tuner 806 configured to interact with an RFID tag 804 that is situated at a loading location 808 for receiving containers 802. The loading location 808 may be one of a plurality of adjacent loading locations for receiving containers 808, such as adjacent bins 320 of an inventory holder 30 (FIG. 6), or zones on a table or other surface (such as at a station 50) for organizing containers 808 so that inventory items 40 for fulfilling an order can be transferred from inventory holders 30 to a particular container 802 assigned for the order (e.g., by designating that items 40 be transferred from their location on the inventory holder 30 to the location of the specified container 802). When the RFID tuner 806 and the RFID tag 804 are brought together, the RFID tag 804 may broadcast a signal to an RFID reader 810, which may prompt the system to also read an RFID tag 812 that may identify the container 802. The container 802 identified by the RFID tag 812 may thus be associated with the RFID tag 804 that indicates a position of the RFID tag 804. Alternatively, the RFID tuner 806 may be configured to provide a uniquely identifiable signal in combination with the RFID tag 804 when the RFID tuner 806 and the RFID tag 804 are joined (e.g., causing the RFID tag 804 to broadcast in a specific frequency band that is different from another specific frequency band that would be broadcast if the RFID tag 804 were joined with a different RFID tuner of a different object), such that the system in a single reading may determine that the container 802 is affiliated with the loading location 808 (as opposed to an adjacent loading location, which may have a different RFID tag that would broadcast a different signal if the container 802 were placed there). As a further alternative arrangement, the container 802 may include an RFID tag 818 and an RFID tuner 820 that respectively correspond to an RFID tuner 816 and an RFID tag 814 of a loading location 808 for receiving the container 802. For example, when the container 802 is positioned at the loading location 808, the RFID tag 818 on the container 802 may interact with the RFID tuner 816 at the loading location 808 while the RFID tuner 820 on the container 802 interacts with the RFID tag 814 at the loading location 808. Such an arrangement may cause the RFID tag 818 on the container 802 and the RFID tag 814 at the loading location 808 to substantially simultaneously broadcast signals detectable by the RFID reader 810 so that the system can identify the container 802 and the loading location 808 within a certain time frame (e.g., substantially simultaneously) and associate the two together.

FIG. 11 is a flowchart illustrating a process 900 that can be performed by a management module 15 according to some embodiments. Process 900 can include, at 910, receiving an RFID signal at a particular frequency from a combination of an RFID tuner positioned at a location and an RFID tag associated with an item. The process 900 can also include, at 912, associating the item with the location. For example, the receiving location may have an RFID tuner operable to activate any number of RFID tags associated with unique items. Hence, when an RFID tag of an item comes in contact (or other sufficient proximity) with the RFID tuner of the particular location, the item can be associated with that location in response to a nearby RFID reader detecting the signal broadcasted by the item. In some embodiments, different RFID tuners can be positioned near one another in order to provide different variations and signals from a single RFID tag. For example, the position of a container 802 among several adjacent receiving zones may be determined based on the signal emitted by an RFID tag on the container when the RFID tag comes in contact with a specific RFID tuner at one of those zones, in contrast with the RFID tag coming in contact with other RFID tuners at other zones. As another example, a roller in a conveyor system may function as or include an RFID tuner such that any time an RFID tag goes across the roller RFID tuner, the RFID tag emits a frequency that can be read by an RFID reader to determine that the particular item was near the roller at a particular time.

In some embodiments, different combinations of RFID tuners can be provided on a wearable accessory that can be utilized with RFID tags on other elements in the system in order to communicate details about the elements and facilitate functions of the inventory system. In one example, RFID tuners may be incorporated in footwear, such as may interact with RFID tags in a floor to provide an indication of an operator's location, stance, or movement patterns. In another example, wearable RFID tuners worn on an operator's hand (e.g., on a glove) may permit the operator to quickly identify a location on an inventory holder 30 where selected inventory items 40 have been stowed, picked (e.g., removed for fulfilling an order), or counted. As a brief illustrative example, a wearable RFID tuner may facilitate an operation in which an operator quickly provides a count or verification of items in a bin by extending a finger with an RFID tuner to touch an RFID tag of a bin and successively touching RFID tags of all of the items in the bin, before repeating the process for a subsequent bin.

As another example, FIG. 12 illustrates a wearable accessory (e.g., a glove 1002) for activating one or more RFID tags of other elements of an inventory system according to a particular embodiment. The glove 1002 can include one or more RFID tuners 1004, 1006. The glove 1002 can interact with items such as inventory items 1008 and 1010, as well as an inventory holder 1032 or individual shelves or bins thereof such as shelves 1012 and 1014. For example, a first item 1008 can include a first RFID tag 1016 and a second RFID tag 1018. Contacting or joining the first RFID tuner 1004 with the first RFID tag 1016 or the second RFID tag 1018 may cause each of the RFID tags 1016 and 1018 to broadcast in a first condition. Contacting or joining of the second RFID tuner 1006 with either of the RFID tags 1016 or 1018 may cause the RFID tags 1016 or 1018 to respond in a different condition detectable by an RFID reader 1034. In this way, the glove 1002 can provide many different modes of input and many different combinations of input. For example, the first RFID tuner 1004 (e.g., on an index finger of a glove) may be used for affirmative indications while the second RFID tuner 1006 (e.g., on a middle finger of the glove) may be used for negative indications, such as to identify problematic situations. As an illustrative example, the first RFID tuner 1004 may be used to successively activate an associating RFID tag 1020 on a second item 1010 and an associating RFID tag 1028 on the shelf 1012 in order to associate the second item 1010 with a first shelf 1012 (e.g., to indicate that the operator wearing the accessory 1002 has placed the item 1010 on the first shelf 1012). Continuing this illustrative example, the second RFID tuner 1006 on the accessory 1002 may be joined with a status RFID tag 1030 on the first shelf 1012 in order to indicate that something is wrong on the shelf 1012 (e.g., that an item is missing), or joined with an associating RFID tag 1020 of the second item 1010 to indicate a problem with an association with the second item 1010 (e.g., that the last shelf 1012 associated with the item 1010 was incorrect), or with a status RFID tag 1022 of the item 1010 to indicate a problem with the second item 1010 itself (e.g., that the item is damaged). Similar or other functions may be provided through RFID tags 1024 and 1026 positioned on a second shelf 1014 or on other components of the inventory system.

Figure 13:
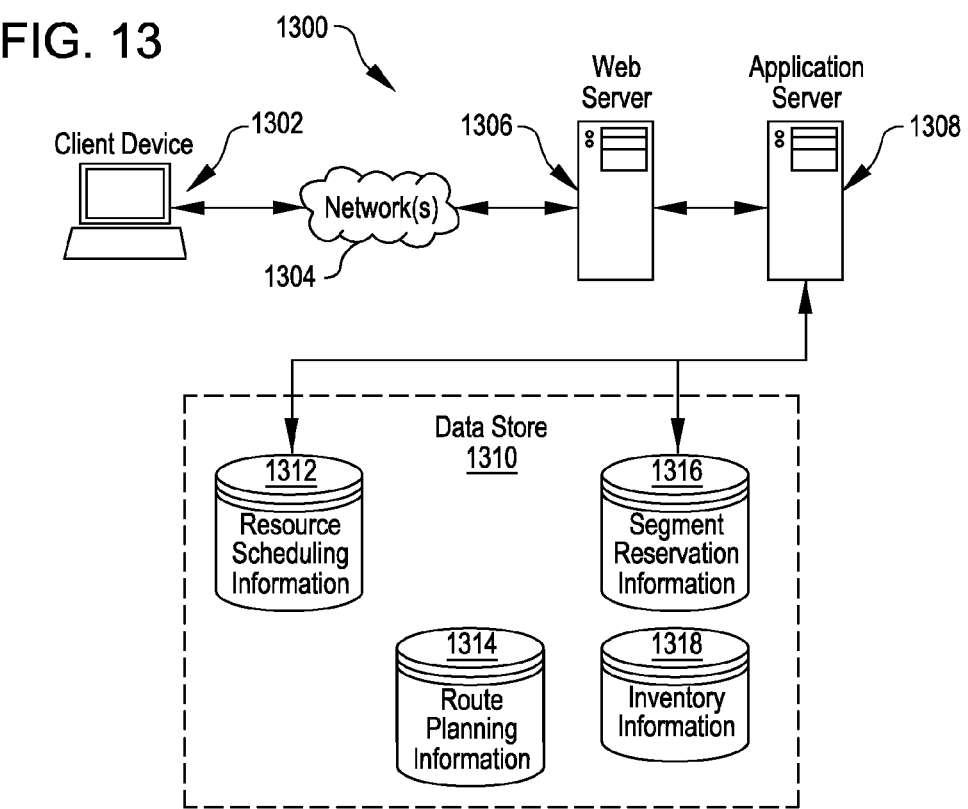
FIG. 13 illustrates an environment in which various features of the inventory system can be implemented, in accordance with at least one embodiment.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing information which can be used by modules described herein, such as resource scheduling information 1312, route planning information 1314, segment reservation information 1316, and/or inventory information 1318. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims. Hence, although the description above primarily references inventory systems, techniques and/or devices disclosed herein may be implemented with respect to any other environment as well. As additional non-limiting examples, RFID tags and RFID tuners may be utilized (e.g., among other options, to determine whether an object having an RFID tag is within a certain proximity of an object having an RFID tuner, to determine relative distances and/or positions between objects having RFID tags and RFID tuners, and/or to provide other inputs or actions based on interactions between RFID tags and RFID tuners) for further inventory system functions (e.g., determining a location of an item on a conveyor system based on an RFID tag interacting with rollers having RFID tuners; determining a presence and/or an arrival order of objects—such as containers or mobile drive units—in a queue based on RFID tags and RFID tuners distributed among the objects and areas of a floor for the queue; verifying that items arranged on surfaces near a dock door are the items that are intended to be by the particular dock door based on RFID tags and RFID tuners distributed among the items and the surfaces; diverting items with RFID tags down an appropriate chute based on interaction with RFID tuners on shoes for pushing items down chutes; locating tools with RFID tags relative to a workbench having RFID tuners) and/or in other environments such as retail environments (e.g., an RFID tuner on a smartphone being brought into proximity with an RFID tag on a book in a bookstore to cause the RFID tag to become readable by an RFID reader on the smartphone to trigger a function like directing an application of the smartphone to a page having information stored about the book), food service environments (e.g., a pair of gloves with RFID tuners that will interact with an RFID tag on a coffee cup to broadcast a signal to an RFID reader near a service counter and prompt a notification that the gloves touching the coffee cup are not the same gloves associated with the customer or service person that placed the order for the coffee cup), restricted access environments (e.g., a ring with an RFID tag that interacts with RFID tuners on one or more doors to provide a signal readable by an RFID reader to provide an access code for the ring-bearer to pass through the one or more doors), and/or entertainment environments (e.g., RFID tags spread throughout a playing surface such as a basketball court so that a ball, puck, shoes, or other player or playing equipment having one or more RFID tuners can be tracked relative to the field of play).

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory management system comprising:
   an inventory holder having a compartment;
   a drawer slidingly received in the compartment;
   a radio frequency identification (RFID) tag associated with a first surface of one of the drawer or the compartment;
   an RFID reader configured to receive radiofrequency signals from the RFID tag;
   an RFID tuner associated with a second surface of the other of the drawer or the compartment, the RFID tuner configured to interact with the RFID tag such that the RFID reader receives a first signal from the RFID tag when the RFID tag is at a first position relative to the RFID tuner and such that the RFID reader receives a second signal from the RFID tag when the RFID tag is at a second position relative to the RFID tuner, the first and second signals being different from each other and the first and second positions being different from each other; and
   a management module configured to:
      access, via the RFID reader, a signal received from the RFID tag;
      determine whether the received signal is the first signal or the second signal from the RFID tag;
      determine a state of closure of the drawer relative to the compartment based at least in part on the received signal; and
      instruct a response based at least in part on the determined state of closure.

2. The inventory management system of claim 1, wherein at least one of: (i) a plurality of RFID tags are associated with the first surface or (ii) a plurality of RFID tuners are associated with the second surface, and wherein the response comprises communicating a percentage of closure of the drawer.

3. The inventory management system of claim 1, wherein the inventory management system further comprises a mobile drive unit configured to move the inventory holder, wherein the response comprises instructing the mobile drive unit so as to prevent movement of the inventory holder while the state of closure of the drawer indicates that the drawer is at least partially open.

4. The inventory management system of claim 1, wherein the response comprises associating an action with the drawer or a location of the drawer based at least in part on a change in the state of closure of the drawer.

5. The inventory management system of claim 1, wherein the management module is further configured to identify an inventory item, wherein the response comprises associating the identified inventory item with the drawer or a location of the drawer based at least in part on a change in the state of closure of the drawer.

6. The inventory management system of claim 1, wherein the management module is further configured to identify an inventory item to be stowed in the inventory holder, wherein the response comprises associating, based at least in part on a change in the state of closure of the drawer, the drawer or a location of the drawer with a location in which the identified inventory item is stowed.

7. The inventory management system of claim 1, wherein the management module is further configured to identify an inventory item to be removed from the inventory holder, wherein the response comprises associating, based at least in part on a change in the state of closure of the drawer, the drawer or a location of the drawer with a location from which the identified inventory item is removed.

8. The inventory management system of claim 1, wherein the management module is further configured to identify an inventory item to be counted in the inventory holder, wherein the response comprises associating, based at least in part on a change in the state of closure of the drawer, the drawer or a location of the drawer with a location in which the identified inventory item is counted.

9. The inventory management system of claim 1, wherein the management module is further configured to identify the drawer or a location of the drawer as a target for an action, wherein the response comprises confirming, based at least in part on a change in the state of closure of the drawer, that the drawer or the location of the drawer was used for the action.

10. A method comprising:
    receiving, by a radiofrequency identification (RFID) reader, an RFID signal from an RFID tag interacting with an RFID tuner, the RFID tag being associated with one of a moveable object or a receiving surface and the RFID tuner being associated with the other of the moveable object or the receiving surface, wherein a first RFID signal is received when the RFID tag is at a first distance relative to the RFID tuner, and a second RFID signal is received when the RFID tag is at a second distance relative to the RFID tuner; and identifying a position of the moveable object relative to the receiving surface based at least in part on the received RFID signal, wherein the RFID tag is proximally located with the RFID tuner at the first distance such that the first RFID signal comprises a first frequency band, and the RFID tag is not proximally located with the RFID tuner at the second distance such that the second RFID signal comprises a second frequency band, the first and second frequency bands being different.

11. The method of claim 10, further comprising identifying a movement of the moveable object relative to the receiving surface based at least in part on a change of the received RFID signal between the first RFID signal and the second RFID signal.

12. The method of claim 10, wherein a plurality of RFID tags are associated with the one of the moveable object or the receiving surface and a plurality of RFID tuners are associated with the other of the moveable object or the receiving surface;

wherein, for each RFID tag, the first RFID signal is received when the RFID tag is at the first distance relative to one of the plurality of RFID tuners; and wherein identifying the position of the moveable object relative to the receiving surface based at least in part on the received RFID signal comprises determining the position of the moveable object relative to the receiving surface based on a number of received first RFID signals.

13. The method of claim 10, wherein a plurality of RFID tuners are associated with the other of the moveable object or the receiving surface;

wherein, for each of the plurality of RFID tuners, a unique RFID signal is received when the RFID tag is at the first distance relative to the RFID tuner; and wherein identifying the position of the moveable object relative to the receiving surface based at least in part on the received RFID signal comprises determining the position of the moveable object relative to the receiving surface based on the unique RFID signal received from the RFID tag.

14. The method of claim 10, wherein the receiving surface comprises a portion of a compartment forming a portion of an inventory holder configured to be moved by a mobile drive unit, and the moveable object comprises a drawer configured to be received in the compartment.

15. A non-transitory computer-readable storage medium having stored therein instructions that, when executed by one or more processors of a computer system, cause the computer system to at least:

receive, by a radiofrequency identification (RFID) reader, an RFID signal from an RFID tag interacting with an RFID tuner, the RFID tag being associated with one of a mobile object or a receiving surface and the RFID tuner being associated with the other of the mobile object or the receiving surface, wherein a first RFID signal is received when the RFID tag is proximally located with the RFID tuner, and a second RFID signal is received when the RFID tag is not proximally located with the RFID tuner; and associate, based at least in part on the first RFID signal received from the RFID tag proximally located with the RFID tuner, the mobile object with the receiving surface.

16. The non-transitory computer-readable storage medium of claim 15, wherein the mobile object is a container configured to receive inventory items for transfer relative to an inventory system and the receiving surface is a loading location for receiving the container for receipt of inventory items.

17. The non-transitory computer-readable storage medium of claim 15, wherein the instructions further cause the computer system to receive a third RFID signal from a second RFID tag, the second RFID tag attached to the mobile object and the third RFID signal from the second RFID tag identifying the mobile object.

18. The non-transitory computer-readable storage medium of claim 15, wherein the RFID tag is a first RFID tag associated with the mobile object and the RFID tuner is a first RFID tuner associated with the receiving surface, and wherein the instructions further cause the computer system to:

receive, by the RFID reader, a third RFID signal from a second RFID tag interacting with a second RFID tuner, the second RFID tag being associated with the receiving surface, and the second RFID tuner being associated with the mobile object;

identify the receiving surface based on the third RFID signal received from the second RFID tag associated with the receiving surface and interacting with the second RFID tuner associated with the mobile object; and identify the mobile object based on the first RFID signal received from the first RFID tag associated with the mobile object and interacting with the first RFID tuner associated with the receiving surface.

* * * * *